Oct. 10, 1950      J. C. DUNGAN      2,525,067
FISHING FLOAT
Filed May 14, 1949
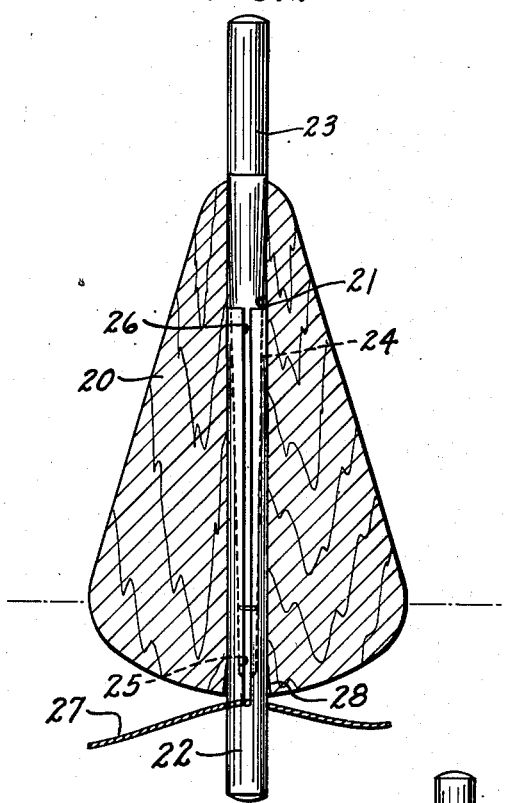
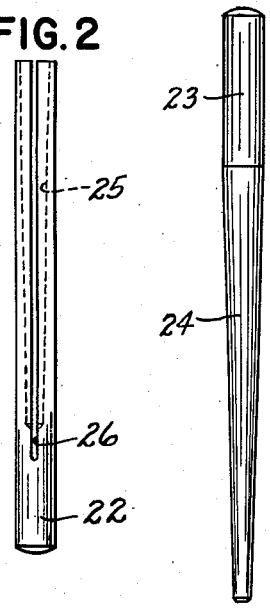
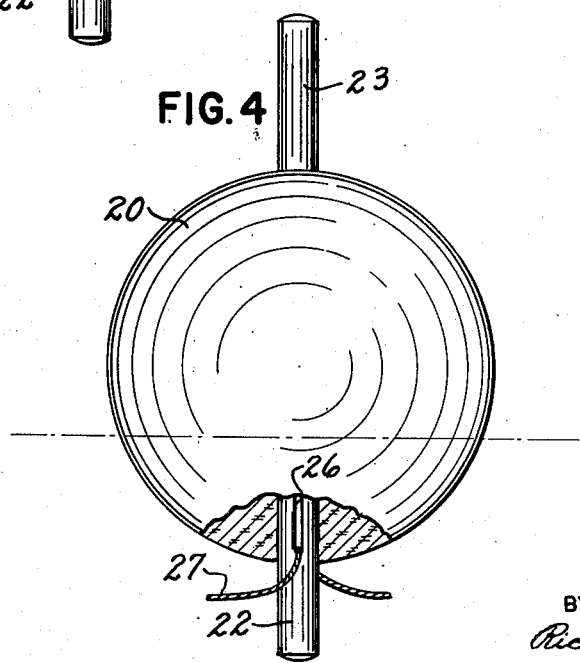
INVENTOR
JAMES C. DUNGAN
BY
Richard Van Busum
HIS ATTORNEY Patented Oct. 10, 1950

2,525,067

UNITED STATES PATENT OFFICE 2,525,067

FISHING FLOAT

James C. Dungan, St. Cloud, Fla.

Application May 14, 1949, Serial No. 93,299

3 Claims. (Cl. 43—44.93)

This invention relates to fishing floats or bobbers and is particularly directed to means for attaching a bobber to a fishing line.

The general object of the present invention is to provide an improved float or bobber for use in fishing.

Another object is the provision of novel means for attaching a fishing float or bobber to a fishing line.

Still another object is to provide novel means for attaching a fishing float or bobber to a fishing line, whereby said bobber may be fixed in any desired position of adjustment on said line, or whereby said bobber may be free so that said line is free to play-out or run in relation thereto.

A further object is to provide a fishing float or bobber with improved means for either fixing said bobber on a fishing line or for having it free to slide or slip on said line, said means comprising a two-piece plug, one piece of which is an adjustable fit in a bore in the bobber and has a slot to receive said fishing line, said one piece being expandable by the other piece into firm contact with the bore to secure said plug in said bore.

With these and incidental objects in view, the invention includes certain novel features of construction and combinations of parts, a preferred form or embodiment of which is hereinafter described with reference to the drawing which accompanies and forms a part of this specification.

In the drawing:

Fig. 1 is a cross-sectional view of the bobber of this invention.

Fig. 2 is a detail view of one portion of the two-piece plug.

Fig. 3 is a detail view of the other portion of the two piece plug.

Fig. 4 is a view of a bobber having a round or spherical body portion.

Description

Referring to the figures of the drawing, in which like reference numerals refer to like parts, the present invention is directed to an improved fishing float or bobber, having a body portion 20 made of balsa wood, cork, plastic or other buoyant material suitable for the purpose. The body portion may be the shape of an inverted cone, as shown in Fig. 1, or it may be spherical as shown in Fig. 4.

The body 20 has a central bore 21 therethrough to receive the bottom piece 22 of a two-piece cylindrical plug, said piece 22 being preferably a close slip fit in said bore. The two-piece plug also includes a top piece 23, having a tapered portion 24 which fits in a matching tapered hole 25 in the piece 22, said bore extending approximately three-fourths the length thereof.

A slot 26 runs lengthwise in the piece 22 and extends a slight distance beyond the bottom of the tapered hole 25 to divide the part of said piece 22 having said tapered hole 25 therein into substantially equal expandable portions, which may be expanded by forceful insertion of the tapered portion 24, to secure the two-piece plug in the bore 21. The taper of the portion 24 and the hole 25 is of the proper degree to hold securely under all conditions of use, but does not prevent the ready separation of said parts whenever it is desirable or necessary. The slot 26 also forms a receptacle for attaching the bobber to a suitable fishing line 27, portions of which are shown in Figs. 1 and 4.

In use the pieces 22 and 23 are removed from the central bore 21 and the fishing line 27 is placed in the slot 26. The piece 22 is then pushed into said central bore 21 and if it is desired that the line be free to slip or run through said slot, said piece 22 is adjusted, as shown in Fig. 1, so that the bottom of the slot 26 is below the perimeter of the bore 21 to provide the necessary clearance. The tapered portion 24 of the piece 23 is then forcefully inserted in the matching tapered hole 25 a sufficient distance to properly expand the expandable portions into firm contact with the wall of the central bore 21, to secure the two-piece plug to the body portion 20.

If it is desired to have the bobber fixed on the line 27, the piece 22 is adjusted in the bore 21, as shown in Fig. 4, so that the bottom of the slot 26 wedges said line into said bore a sufficient distance to properly secure said bobber and said line in fixed relationship to each other.

If desired the mouth of the central bore 21 may be enlarged by countersinking, as at 28, to assist in wedging the fishing line 27 therein. This latter perhaps is a desirable and valuable feature where the body portion 20 is made of a firm material such as certain woods or plastics, but is unnecessary when the body is made of a soft material, such as cork.

While the form of the device herein disclosed is admirably adapted to fulfill the objects primarily stated, it is to be understood that it is not intended to confine the invention to the form or embodiment herein disclosed, for it is susceptible of embodiment in other forms without departing from the spirit and the scope of the invention.

What is claimed is:

1. A bobber for use on a fishing line, comprising in combination a buoyant body portion having a central bore therethrough; a cylindrical plug member constructed and arranged to be a slip fit in the central bore, said member having a tapered hole extending a substantial part of its length, said member also having a slot running lengthwise therein to divide the part thereof having the tapered hole into equal expandable portions, said slot forming a receptacle for the fishing line; and a second plug member tapered to fit the hole in the cylindrical plug member and engageable with said hole for the purpose of expanding the expandable portions to secure said cylindrical plug member in the central bore.

2. In a float for use on a fishing line, the combination of a buoyant body portion, having a central bore therethrough; a first plug member constructed and arranged to be a slip fit in the central bore for axial adjustment therein, said member having a tapered hole which extends a substantial portion of its length, said member also having a slot running lengthwise therein to divide the part thereof having the tapered hole into substantially equal expandable portions, said slot forming a receptacle for the fishing line, in which said line is free when the member is adjusted in the central bore so that the bottom of said slot is beyond the perimeter of said bore, or in which said line is fast when said member is adjusted in the central bore so that the bottom of said slot is within the perimeter of said bore a sufficient distance to obtain the clamping effect desired; and a second plug member tapered to fit the hole in the first plug member and engageable therewith for the purpose of expanding the expendable portions to secure the first member in its adjusted position in the central bore.

3. In a float for use on a fishing line, the combination of a buoyant body portion having a central bore therethrough; a first plug member constructed and arranged to be a slip fit in the bore, said member having a hollow portion and a slot dividing said hollow portion into equal expandable halves, said slot also providing a receptacle for the fishing line; and a second plug member engageable with the hollow portion and effective to expand the expandable halves to secure the first plug member in the central bore.

JAMES C. DUNGAN.

REFERENCES CITED

The following references are of record in the file of this patent:

UNITED STATES PATENTS

| Number | Name | Date |
|---|---|---|
| 332,573 | Tufts | Dec. 15, 1885 |
| 790,301 | Jones | May 23, 1905 |
| 1,468,720 | Low | Sept. 25, 1923 |
| 1,547,746 | Gore | July 28, 1925 |